US011027367B2

United States Patent
Hammer et al.

(10) Patent No.: US 11,027,367 B2
(45) Date of Patent: Jun. 8, 2021

(54) TOOL FOR LASER BEAM PROCESSING, LASER BEAM PROCESSING APPARATUS AND METHOD FOR LASER BEAM PROCESSING

(71) Applicant: Bayerische Motoren Werke Aktiengesellschaft, Munich (DE)

(72) Inventors: Maik Hammer, Bruckberg (DE); Johann van Niekerk, Munich (DE); Alexander Grimm, Karlsfeld (DE); Franz Korber, Mallersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 266 days.

(21) Appl. No.: 16/223,263

(22) Filed: Dec. 18, 2018

(65) Prior Publication Data

US 2019/0118296 A1    Apr. 25, 2019

Related U.S. Application Data

(63) Continuation of application No. PCT/EP2017/062496, filed on May 24, 2017.

(30) Foreign Application Priority Data

Jul. 25, 2016 (DE) ...................... 10 2016 213 580.5

(51) Int. Cl.
*B23K 26/22* (2006.01)
*B23K 37/04* (2006.01)
(Continued)

(52) U.S. Cl.
CPC .......... *B23K 26/22* (2013.01); *B23K 26/0093* (2013.01); *B23K 26/02* (2013.01);
(Continued)

(58) Field of Classification Search
CPC .... B23K 26/22; B23K 26/0093; B23K 26/02; B23K 26/0673; B23K 37/045
See application file for complete search history.

(56) References Cited

U.S. PATENT DOCUMENTS 4,128,753 A    12/1978 Sharp
4,654,505 A *  3/1987 Sciaky ................. B23K 26/067
                                          219/121.63
(Continued)

FOREIGN PATENT DOCUMENTS

CN    202894199 U    4/2013
CN    103221174 A    7/2013
(Continued)

OTHER PUBLICATIONS

International Search Report (PCT/ISA/210) issued in PCT Application No. PCT/EP2017/062496 dated Aug. 30, 2017 with English translation (four (4) pages).
(Continued)

*Primary Examiner* — Geoffrey S Evans
(74) *Attorney, Agent, or Firm* — Crowell & Moring LLP

(57) ABSTRACT

A tool for laser beam processing is provided. The tool includes an upper tool and a lower tool, which are able to be advanced toward one another by way of a press, such that at least one component is able to be fixed in a predefined position between the upper tool and the lower tool. At least one laser beam exit surface, which is part of an inner surface of the upper tool or lower tool, and at least one laser beam guide, into which laser radiation is able to be coupled and is able to be directed through the laser beam exit surface onto a processing location on the component are provided. A control device, which enables and/or disables the coupling of laser radiation into the at least one laser beam guide depending on the advancing movement between upper tool
(Continued)

and lower tool is provided. Furthermore, a laser beam processing apparatus and a method for laser beam processing are also provided.

12 Claims, 1 Drawing Sheet

(51) Int. Cl.
    *B23K 26/035* (2014.01)
    *B23K 26/00* (2014.01)
    *B23K 26/02* (2014.01)
    *B23K 26/067* (2006.01)
    *B23K 101/00* (2006.01)

(52) U.S. Cl.
    CPC ........ *B23K 26/037* (2015.10); *B23K 26/0673* (2013.01); *B23K 37/0435* (2013.01); *B23K 2101/006* (2018.08)

(56) References Cited

U.S. PATENT DOCUMENTS

| | | | |
|---|---|---|---|
| 5,616,261 A * | 4/1997 | Forrest | B23K 26/067 219/121.63 |
| 6,710,291 B1 | 3/2004 | Wegener et al. | |
| 2004/0142273 A1 * | 7/2004 | Nishida | B32B 37/0076 430/200 |
| 2012/0292807 A1 * | 11/2012 | Hulliger | B29C 33/00 264/139 |
| 2013/0220983 A1 | 8/2013 | Haschke et al. | |

FOREIGN PATENT DOCUMENTS

| | | |
|---|---|---|
| CN | 204936295 U | 1/2016 |
| CN | 205347860 U | 6/2016 |
| DE | 27 34 759 A1 | 2/1978 |
| DE | 10 2011 050 383 A1 | 11/2012 |
| EP | 1 002 595 A2 | 5/2000 |
| JP | 1-197092 A | 8/1989 |
| JP | 2009-160597 A | 7/2009 |
| WO | WO 96/40467 A1 | 12/1996 |
| WO | WO 03/053607 A1 | 7/2003 |

OTHER PUBLICATIONS

German-language Written Opinion (PCT/ISA/237) issued in PCT Application No. PCT/EP2017/062496 dated Aug. 30, 2017 (six (6) pages).

German-language Search Report issued in counterpart German Application No. 10 2016 213 580.5 dated Mar. 16, 2017 with partial English translation (12 pages).

Chinese-language Office Action issued in Chinese Application No. 201780030279.X dated Mar. 25, 2020 with English translation (18 pages).

Chinese-language Office Action issued in Chinese Application No. 201780030279.X dated Aug. 20, 2020 with English translation (13 pages).

* cited by examiner

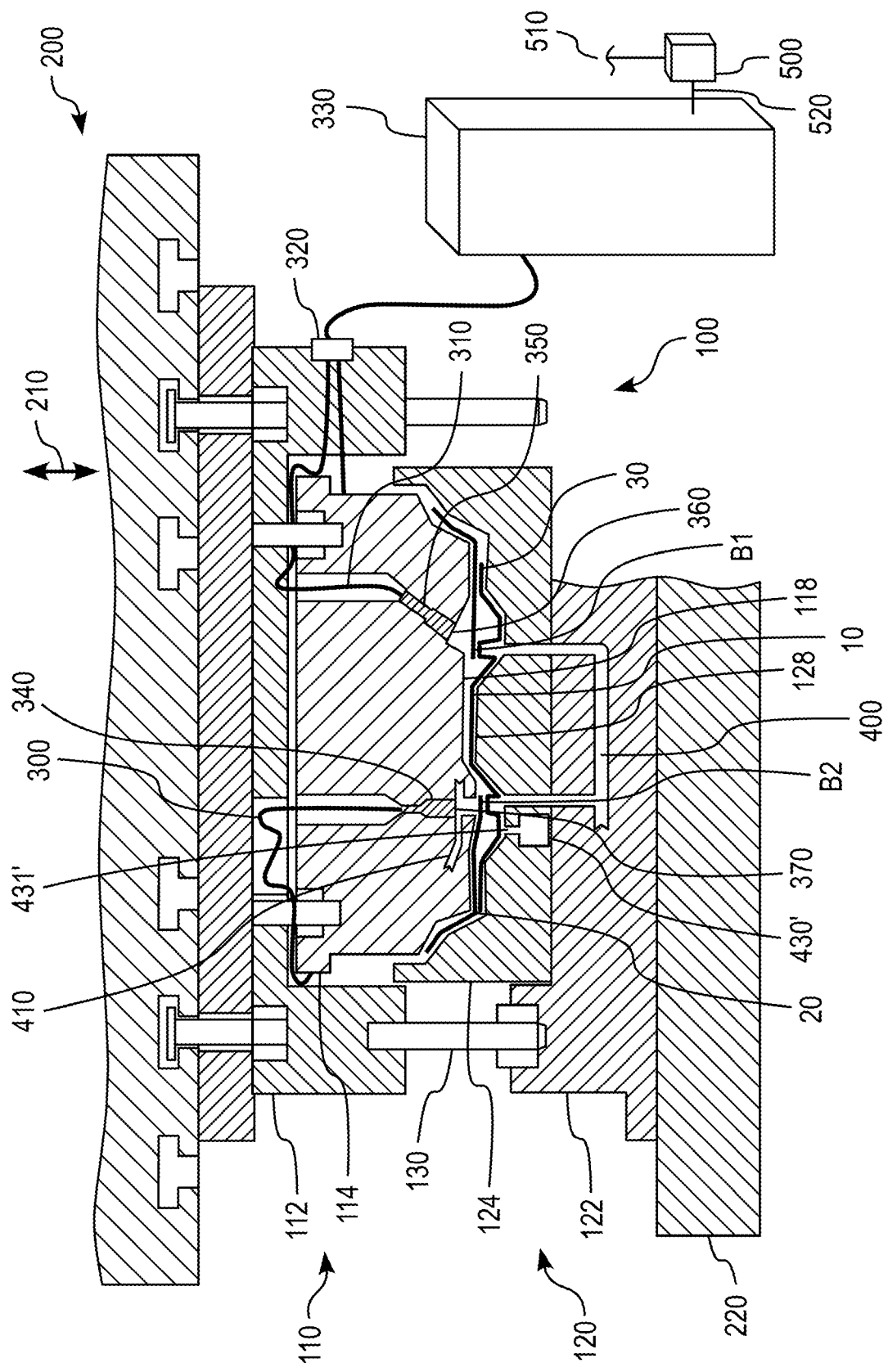

TOOL FOR LASER BEAM PROCESSING, LASER BEAM PROCESSING APPARATUS AND METHOD FOR LASER BEAM PROCESSING

CROSS REFERENCE TO RELATED APPLICATIONS

This application is a continuation of PCT International Application No. PCT/EP2017/062496, filed May 24, 2017, which claims priority under 35 U.S.C. § 119 from German Patent Application No. 10 2016 213 580.5, filed Jul. 25, 2016, the entire disclosures of which are herein expressly incorporated by reference.

BACKGROUND AND SUMMARY OF THE INVENTION

The invention relates to a tool for laser beam processing, to a laser beam processing apparatus and to a method for laser beam processing.

In large-scale manufacturing, in particular in the automotive industry, many successive processing steps are required on a component, or for interconnecting a plurality of components, respectively. Various manufacturing methods are used herein. The processing of components by way of a laser beam is being increasingly used herein.

In laser beam processing systems, the radiation of a laser source by means suitable for guiding and shaping the laser beam as a highly energized laser beam is guided to a laser processing tool and by the latter directed onto the processing location. Depending on the type of processing, various laser processing tools are used. For example, tools in the form of pliers by way of which laser joining or laser cutting can be carried out or so-called scanner optics which by way of a movable optical system can guide the laser beam across the component and focus said laser beam relative to said component are known.

Press-bound processing steps, for example for forming, cutting or punching the components, are often also required in the same manufacturing line. Press-bound tools are usually composed of an upper tool and a lower tool which are converged by the closing movement of a press and which interact in the closed and/or closing state.

The upper tool and the lower tool can be embodied so as to be one part or in multiple parts. For example, the upper tool can include a tool upper part, as well as a downholding unit that is separately relocatable to the latter and further tool elements such as, for example, punching or drawing rams. The lower tool can likewise have, for example, a tool lower part and a ram disposed thereon, as well as further elements which communicate for example with the tool elements of the upper tool, such as, for example, dies. The press can be operated as an individual press or in a press line.

A combination of a laser processing apparatus and a press is known from the publication DE 10 2011 050 383 A1. The latter in a press-bound progressive die having a plurality of workstations provides one workstation solely for laser processing, to which end means for beaming in laser radiation are integrated in the processing tool. To this end, a tool upper part by way of a gap is divided into two sections, i.e., a first and a second upper section. A laser scanner which beams the laser radiation laterally into the gap and by way of a deflection mirror that is located in the gap guides said laser radiation onto the workpiece is assembled on a clamping plate of the tool. The workpiece first enters the first upper section, therein is subjected to a plurality of processing steps, and then exits the first upper section, where said workpiece is processed by way of the laser radiation before said workpiece is transported onward into the second upper section.

It is an object of the invention to specify a tool for laser beam processing and a laser beam processing apparatus which are capable of being integrated in existing manufacturing lines and by way of which processing tasks that arise in large-scale manufacturing, in particular in the automotive industry, can be solved in a cost-effective manner, and to specify a corresponding method.

This and other objects are achieved by a tool, a laser processing apparatus, and/or a method according to embodiments of the invention. Further advantageous embodiments are derived from the features described below.

According to the invention, the tool has an upper tool and a lower tool which are capable of being mutually converged by way of a press such that at least one component is capable of being fixed in a predefined position between the upper tool and the lower tool. At least one laser beam exit face which is part of an internal face of the upper tool or of the lower tool and at least one laser beam guide into which laser radiation is capable of being coupled and is capable of being directed by way of the laser beam exit face onto a processing location on the component are provided. Furthermore, a control installation which releases and/or blocks the coupling-in of laser radiation into the at least one laser beam guide so as to depend on the actuation movement between the upper tool and the lower tool is provided.

By way of this tool, laser beam processing is relocated into a press, wherein an additional radiation protection housing can be dispensed with. Rather, the tool per se functions as a protective housing in that releasing of the laser source, or coupling-in of the laser radiation into the tool, respectively, is performed only once it has been ensured by virtue of the actuation movement by the press that a sufficient overlap of the tool halves exists such that no laser radiation can escape from the tool to the outside. A further contribution toward ensuring safety is that the laser beam exits the laser beam guide only on the internal face. An internal face herein is referred to as a surface of the upper tool or of the lower tool that faces the component and at least in part comes to bear on the component, wherein the internal face in the region of the laser beam exit face can be recessed in relation to the component. The position of the laser beam exit face is preferably chosen such that said position is close to the location where component processing is to take place. Simple optics can be used by virtue of this spatial proximity. A complex apparatus for positioning the beam can be dispensed with since the laser beam exit face as part of the internal face of the tool is positioned by the closing movement of the tool.

The upper tool can be configured in one part or in multiple parts, for example so as to have a tool upper part and a downholding unit that fixes the component, wherein the laser beam exit face is preferably configured as part of an internal face of the downholding unit that faces the component. The lower tool can likewise be configured in one part or in multiple parts, for example so as to have a tool lower part and a ram, wherein the laser beam exit face is preferably part of an internal face of the ram that faces the component.

The internal faces of the upper tool and of the lower tool preferably have a contour which is adapted to the shape of the component to be processed, such that the component by way of the closing movement is fixed in a planar manner in a predefined position. If in one design embodiment two or more components are to be simultaneously processed, for example joined to one another, in the tool, the contours of the internal faces of the upper tool and of the lower tool are preferably designed such that the components in the case of a closed tool are mutually fixed in the envisaged joining position. The gap accuracy which is extremely important for laser beam welding can thus be set in an optimal and simple manner by way of the tool.

The at least one laser beam guide serves for transmitting onward or for shaping the radiation emanating from a laser source. In the simplest case, the laser beam guide is an optical fiber which directs the laser radiation up to the laser beam exit face, the latter in this case being formed by the free end of the optical fiber. Alternatively, a plurality of optical fibers or a bundle of fibers can be provided. It is likewise possible for a laser optical system to be additionally provided, for example in the form of one or a plurality of lenses, wherein the laser beam exit face is formed by a lens surface, for example.

The tool preferably has two or a plurality of spatially mutually separated laser beam exit faces. In each case one laser beam is capable of being directed onto a processing location by way of each of said laser beam exit faces. The laser beam exit faces can be disposed in the upper tool or else in the lower tool, depending on the processing task. Simultaneous laser beam processing is advantageously possible at a plurality of spatially mutually spaced apart processing locations. The type of laser beam processing at the processing locations herein can be identical. All laser beam processing that is required on the component can thus advantageously be carried out or at least started simultaneously. Mutually dissimilar laser beam processing can likewise be carried out in each case at the processing locations.

Each laser exit face is advantageously assigned one laser optical system which is specified for carrying out exactly one processing task, wherein the use of expensive scanner systems is superfluous and the use of laser optics which are contemplated so as to be minimalistic and which, for example, are composed of only one optical fiber or of an optical fiber having exactly one lens is enabled.

In one further design embodiment lines for feeding inert gas, for cooling and for suctioning welding fumes are configured in the upper tool and/or in the lower tool, a fluid being capable of being fed to and discharged from at least the processing locations by way of said lines. Feeding or suctioning, respectively, can be performed using known devices which are connectable to the lines.

The components can in particular be sheet-metal formed parts, wherein castings or profiled parts can also be used. Said components can in particular be a body component or a body add-on component, preferably for a passenger motor vehicle. The components are preferably metal components and can be formed in particular from a sheet-metal material such as, for example, steel sheet, aluminum sheet or magnesium sheet. When two or more components are simultaneously fixed in the tool, the at least one second component can also be an auxiliary joining element which is to be fastened to the first component, such as a ball, a nut, a bolt, or the like, for example, wherein the auxiliary joining element is preferably formed from a metallic material.

In the case of an opened tool, the components can be inserted into the tool manually or in an automated process. If the at least one second component is an auxiliary joining element such as, for example, bolts or balls, the tool in a further design embodiment can also have an insertion unit for the second component. The in-principle construction of such an insertion unit is known and can include, for example, a feeding and singularizing apparatus as well as a feeding duct. The singularized auxiliary joining elements are conveyed by the feeding apparatus, for example by way of compressed air or mechanical slides, from a standby position into the tool by way of the feeding duct. The feeding duct can lead through the upper tool or lower tool, wherein said feeding duct at the processing location advantageously opens into the tool interior formed between the upper and lower tool on a side that is opposite the laser beam exit face. The feeding of the auxiliary joining elements can thus be performed in a positionally precise manner directly onto the inserted first component in the case of an already closed or partially closed tool, and a positionally precise joining of the auxiliary joining elements by way of a laser becomes possible. In order for the auxiliary joining elements to be precisely positioned, the tool in the region of the feeding duct mouth preferably has a contour that receives the auxiliary joining element in a form-fitting manner. The feeding of additional material to the components can of course also be implemented in a similar manner.

In order for the laser beam processing in terms of the process to be monitored on-line, a process monitoring apparatus can furthermore be provided. Such a known process monitoring apparatus has, for example, a CMOS camera which is coupled into the laser processing optical system such that said CMOS camera captures image data of the processing location. For measuring and monitoring characteristic process variables, the image data is evaluated by an evaluation computer having suitable software.

The tool according to the invention can be used in a single press as well as in a press line or a transfer press.

The invention furthermore relates to a laser processing apparatus having a tool according to the invention for laser beam processing, a laser source which is coupled to the at least one laser beam guiding means, and a press in which the tool is installed. The laser source is preferably located outside the tool and outside the press and is connected to the laser beam guide in the tool by way of optical fibers, for example.

The control installation which ensures that coupling of the laser radiation into the tool is performed only when the tool is sufficiently closed can block or release the laser source, for example, or suitably interrupt or deflect, respectively, the laser beam. The control installation, besides an output for blocking or releasing, respectively, the laser beam, has an input for detecting the closed position or the closing movement of the press.

The invention furthermore relates to a method for laser beam processing, in particular while using the laser beam processing apparatus according to the invention, in which method at least one component by way of an upper tool and a lower tool which are mutually converged by the closing movement of a press are positioned and fixed in relation to one another. Thermal energy is induced into the at least one component at at least one processing location by way of a laser beam for carrying out component processing, wherein the laser beam exits by way of a part of a tool internal face of the upper tool or of the lower tool that is designed as a laser beam exit face. The laser processing takes place in a temporal window in which the upper tool and the lower tool, by virtue of the closing movement of the press, in the manner of a protective housing shield the environment from the laser radiation.

Two or more components by way of the contour of the internal faces of the upper tool and of the lower tool are preferably mutually fixed in a predefined joining position.

The temporal window in which the laser processing can be judged to be safe and can be released depends, inter alia, on the exact tool geometry and on the press movement. For example, a specific range ahead of and behind the lower dead center (LDC) of the press can be classified as safe, this in the case of a crank press or an eccentric press being a range defined in degrees ahead of and after the LDC, for example. The implementation of the laser beam release is performed by the control installation. To this end, the latter can compare the current position of the press plunger with the predefined range in degrees, for example, and by way of a corresponding output switch a signal for releasing or blocking the laser beam.

The laser beam processing carried out in the tool is preferably welding or soldering/brazing, wherein two components are connected to one another, for example. The laser beam processing can likewise be cutting or subtracting material. The tool, or the method, respectively, can likewise be used for locally subtracting a component coating at the processing locations, for example for removing an anti-corrosion coating such as, for example, a zinc layer. On account thereof, the components can be prepared for downstream welding processes and the latter can be carried out in a more stable manner, and quality problems as well as post-machining on welded locations and seams can be minimized. The laser beam processing can furthermore be heating of at least one of the components. This is particularly expedient when forming of at least one component is envisaged at the heated location, for example by press-fitting two components into one another. The tool can include further cutting, punching or forming means such that further separating or forming procedures can be carried out in parallel with the laser processing in the same press stroke.

The laser beam processing can be a purely punctiform processing. However, it is also possible for a laser beam movement relative to the contact location of the components to be implemented. Since shielding that is sufficient as laser protection can already be provided by the tools before the press reaches the lower dead center thereof, the above-described temporal window ahead of and after the lower dead center results. If the laser beam is activated beyond said temporal window, it is possible that the laser beam that is already directed onto the component conjointly with the tool carries out a movement relative to the component. Alternatively or additionally, a minor movement of the beam, for example a reciprocating movement or a circular movement, can also be performed by way of the minimalistic optical system, for example by way of a movable lens.

The invention enables the rapid method of laser beam welding to be integrated in a cost-effective manner into an existing manufacturing line. Neither a separate laser protection nor any complex optics are required. A plurality of welding procedures or laser processing procedures, respectively, can be carried out simultaneously, on account of which a high utilization of the system is achievable without the requirement of additional intermediate buffers.

The above-described properties, features and advantages of this invention, and the manner in which said properties, features and advantages are achieved, will become more clearly and evidently understandable in the context of the description hereunder of the exemplary embodiments. In as far as the term "can" is used in this application, this refers to both the technical potential as well as to the actual technical implementation.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is an exemplary sectional view of a tool for laser beam processing in a press.

DETAILED DESCRIPTION OF THE DRAWING

An exemplary tool for laser beam processing is illustrated in FIG. 1 in a schematic sketch. The tool 100 is installed in a press 200, wherein an upper tool 110 by way of the press plunger (not illustrated) is moved for carrying out an actuation movement illustrated by the arrow 120, and a lower tool 120 is rigidly fastened to the press table 220. The lower tool 120 and the press table 220 are illustrated only in fragments in FIG. 1. The upper tool 110 and the lower tool 120 are mutually guided by way of sleeves 130.

The lower tool 120 has a tool lower part 122 as well as a ram 124 that is rigidly fastened to the tool lower part 122. The upper tool 110 includes a tool upper part 112 and a downholding unit 114 which is linked to the tool upper part 112.

Three components 10, 20 and 30 are disposed between the lower tool 120 and the upper tool 110, more specifically between the downholding unit 114 and the ram 124. The components 10, 20 and 30, by way of the internal faces 118 and 128, are mutually fixed in a predefined position, to which end the internal faces 118 and 128 are designed in a corresponding manner. The internal face 128 has a contour which supports the first component 10 bearing thereon, for example, while the internal face 118 of the downholding unit 114 is shaped so as to correspond to the contour of the second component 20 and the third component 30. On account thereof, a precise and reproducible mutual positioning of the components 10, 20 and 30 results in the case of a closed tool 100.

In order for laser beam processing to be carried out, laser beam guide 300 and 310 in the form of in each case, e.g., one optical fiber are guided through clearances in the tool upper part 112 and in the downholding unit 114, said optical fibers terminating in an uncoupling apparatus 320 for coupling laser radiation of a laser source 330 into the tool 100. The optical fibers 300 or 310, respectively, by way of the other end thereof terminate in in each case one laser optical system 340 or 350, respectively, the latter guiding the coupled-in laser radiation to a processing location B1 or B2, respectively, on the components. The laser radiation exits the tool at a first or a second laser beam exit face 360 or 370, respectively, the latter being integrated preferably without a gap in the tool internal face 128 of the downholding unit 114 and potentially being recessed in relation to the component, as is shown in FIG. 1.

On account of the closing movement of the tool, the laser beam exit faces 360, 370 are positioned at a defined position and so as to be very close to the processing locations B1, B2. The laser optical systems 340 and 350 can therefore be embodied so as to be minimalistic. For example, the optical system can be implemented by way of a single lens which simultaneously functions as the laser beam exit face 360 or 370, respectively. It is likewise contemplated for an optical system in the tool 100 to be dispensed with and only for an optical fiber to be guided through the tool 100. In this case, the laser beam exit face 360 or 370, respectively, would be implemented by way of the free end of the optical fiber 300 or 310, respectively.

Lines 400 and 410 in the form of a duct system are furthermore configured in the tool 100, said lines 400 and 410 for the sake of clarity being illustrated only in fragments in FIG. 1. A process gas, such as an inert gas, for example, can be fed to the processing locations by way of these lines by way of known conveying installations, and/or welding fumes can be discharged from said processing locations.

If auxiliary joining elements are to be joined to the sheet-shaped component 10 in the tool, the tool can thus also have an insertion unit. The insertion unit can be implemented, for example, by way of a feeding and singularizing apparatus as well as by way of a feeding duct 430' that is configured in the upper tool or the lower tool. For example, as shown in FIG. 1, the feeding duct 430' at the processing location B2 opens into a tool 120 interior on a side that is opposite the at least one laser beam exit face 360 370, and a feeding duct mouth 431' is configured to position the at least one auxiliary joining element precisely on the component 10. The singularized auxiliary joining elements are conveyed by the feeding apparatus, for example by way of compressed air or mechanical slides, from a standby position into the tool by way of the feeding duct. The tool preferably has a contour that receives the auxiliary joining element in a form-fitting manner in order for the auxiliary joining elements to be precisely positioned.

Laser processing can take place in the tool 100 only when it is ensured by way of the closing movement of the press 200 that a sufficient overlap or congruence of the tool components is provided such that laser radiation that exits the laser beam exit faces 360, 370 cannot escape from the tool 100. Depending on the design embodiment of the upper tool 110 and of the lower tool 120, this secure state can exist only at the lower dead center (LDC) of the press 200, or across a range which extends from a point ahead of the LDC to a point after the LDC. In order for the laser processing to take place only when said secure state is provided, a control installation 500 which by way of an input 510 receives signals from which the position or the closing movement of the press 200 can be determined. The control installation 500 is specified for evaluating the signals as to whether the secure state is present and for generating a corresponding output signal. In order for the output signal to be transmitted, the control apparatus by way of an output 520 is operatively connected in a blocking or releasing manner to the laser source 330.

While laser beam processing according to FIG. 1 is performed exclusively from above, that is to say so as to emanate from the upper tool 110, the laser beam exit faces and laser beam guide can likewise be provided only in the lower tool 120, or both in the upper tool 110 as well as in the lower tool 120.

LIST OF REFERENCE SIGNS 10, 20, 30 Component
100 Tool
110 Upper tool
112 Tool upper part
114 Downholding unit
118 Internal face upper tool
120 Lower tool
122 Tool lower part
124 Ram
128 Internal face lower tool
200 Press
210 Actuation movement
220 Press table
300, 310 Laser beam guide
320 Coupling-in apparatus
330 Laser source
340, 350 Laser optical systems
360, 370 Laser beam exit face
400, 410 Lines
500 Control installation
510 Input
520 Output
B1, B2 Processing location The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tool for laser beam processing, comprising:
    an upper tool and a lower tool which are mutually convergeable by way of a press such that at least one component is fixable in a predefined position between the upper tool and the lower tool;
    at least one laser beam exit face which is part of an internal face of the upper tool or of the lower tool;
    at least one laser beam guide into which laser radiation is couplable and is directable by way of the laser beam exit face onto a processing location on the component;
    a control installation which releases and/or blocks coupling-in of the laser radiation into the laser beam guide so as to depend on actuation movement between the upper tool and the lower tool, and
    an insertion unit by way of which at least one auxiliary element is feedable by way of a feeding duct that leads through the upper or lower tool, wherein
        the feeding duct at the processing location opens into a tool interior on a side that is opposite the at least one laser beam exit face, and
        a feeding duct mouth is configured to position the at least one auxillary joining element precisely on the component.

2. The tool according to claim 1, wherein the internal faces of the upper tool and of the lower tool have a contour by way of which at least two components are mutually fixable in a predefined joining position.

3. The tool according to claim 1, wherein the laser beam exit face is formed by a free end of an optical fiber or by a lens.

4. The tool according to claim 1, wherein the tool comprises two or more spatially mutually separated laser beam exit faces by way of which in each case one laser beam is directable onto a processing location.

5. The tool according to claim 4, wherein at least one of the two or more spatially mutually separated laser beam exit faces is formed by a free end of an optical fiber or by a lens.

6. The tool according to claim 5, wherein each of the at least one of the two or more spatially mutually separated laser beam exit faces is assigned one laser processing optical system which is specified for carrying out exactly one processing task.

7. The tool according to claim 1, wherein each of the at least one laser beam exit face is assigned one laser processing optical system which is specified for carrying out exactly one processing task.

8. The tool according to claim 1, further comprising:
    lines which are configured in the upper tool and/or in the lower tool and by way of which a fluid is feedable to and dischargeable from at least the processing location.

9. A laser processing apparatus, comprising:
    a tool according to claim 1;

a laser source which is coupled to the at least one laser beam guide; and a press in which the tool is installed.

10. A method for laser beam processing, the method comprising the acts of:

fixing at least one component in a predefined position by way of an upper tool and a lower tool which are mutually converged by closing movement of a press;

inducing thermal energy into the at least one component at at least one processing location by way of a laser beam for carrying out component processing, wherein the laser beam exits by way of a part of an internal face of the upper tool or of the lower tool that is designed as a laser beam exit face, and laser beam processing takes place in a temporal window in which the upper tool and the lower tool, by virtue of the closing movement of the press, in a manner of a protective housing shield environment from laser radiation; and providing an insertion unit by way of which at least one auxillary element is feedable by way of a feeding duct that leads through the upper or lower tool, wherein the feeding duct at the processing location opens into a tool interior on a side that is opposite the at least one laser beam exit face, and a feeding duct mouth is configured to position the at least one auxillary joining element precisely on the component.

11. The method according to claim 10, wherein a first component and at least one second component by way of a contour of the internal faces of the upper tool and of the lower tool are mutually fixed in a predefined joining position.

12. The method according to claim 10, wherein the laser beam processing is welding, soldering/brazing, subtraction of material, local removal of a component coating or heating of the at least one component.

* * * * *